UNITED STATES PATENT OFFICE.

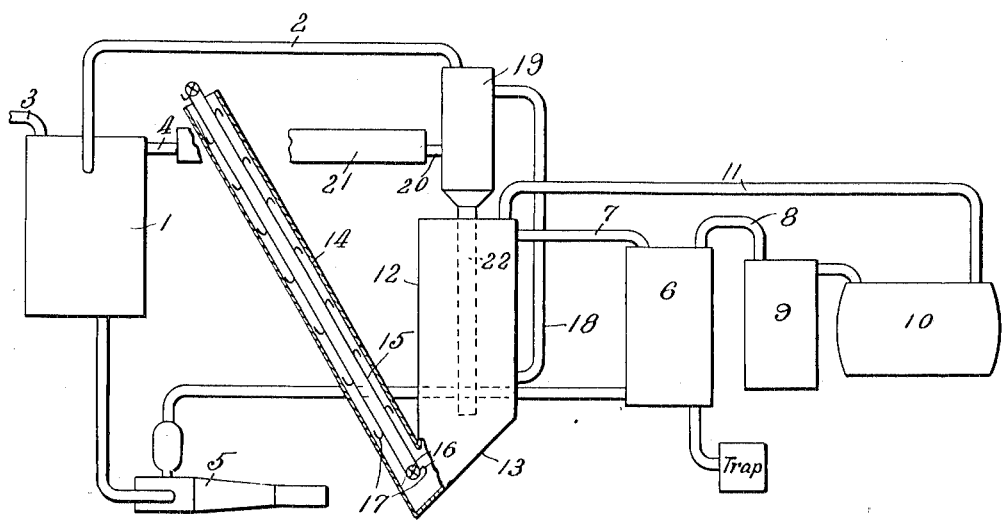

CHARLES L. WEIL, OF ST. CLAIR, MICHIGAN, ASSIGNOR TO DIAMOND CRYSTAL SALT COMPANY, OF ST. CLAIR, MICHIGAN, A CORPORATION OF MICHIGAN.

PROCESS OF MAKING SALT.

1,105,387.          Specification of Letters Patent.          Patented July 28, 1914.

Application filed May 31, 1911. Serial No. 630,287.

*To all whom it may concern:*

Be it known that I, CHARLES L. WEIL, a citizen of the United States, and a resident of St. Clair, in the county of St. Clair and State of Michigan, have invented certain new and useful Improvements in Processes of Making Salt, of which the following is a specification.

This invention relates to processes of making salt; and it comprises a method of evaporating salt wherein brine, which may be fresh brine or tail brine, is preliminarily heated by vapors from the self-evaporation of brine in a later stage, is then placed under pressure and is further heated by vapors from self-evaporation in a later stage, is again heated, is then allowed to undergo self-evaporation in a plurality of stages and is finally submitted to further evaporation, all as more fully hereinafter set forth and as claimed.

In the manufacture of salt, it is desirable to have a full control of the size of grain, a maximum evaporative efficiency in the apparatus employed and the possibility of securing a high output of crystallized salt from an apparatus of comparatively moderate size.

The object of the present invention is to secure these results by an automatic, self-regulating method of operation. For this purpose I rearrange the conditions of evaporation and the apparatus therefor in such a manner as to secure a methodical utilization of heat while allowing the apparatus and operation to be under full control at all times.

I advantageously supply the evaporating system with fresh brine and with tail brine from the apparatus itself in such proportion as will secure an evaporation to the exact extent desired in the material passing through the system.

In an advantageous embodiment of the present invention, a mixture of tail brine, coming from an apparatus later described, with fresh brine is transmitted through a preheater which is supplied with vapors from self-evaporation or "flash" evaporation occurring later in the system. This preheater is on the suction side of a pump adapted to deliver brine under some pressure. From the pump the brine goes to and through a second preheater where it is further heated by vapors from self-evaporation later in the system. From this second preheater, the brine may now go to and through a third heater where it may be heated with live steam, as the brine is under pump pressure, to any temperature desired. It may, for instance, be heated to 260° F, or above, according to conditions and the amount of self-evaporation later desired. Being heated under pressure, when it arrives at the temperature stated there is a tendency for the deposition of gypsum and other impurities and the brine is removed and passed through a filter where deposition occurs and the deposited matters are removed. From the filter, the superheated purified brine goes forward to a plurality of self-evaporators or "flash" evaporators. Two may be used. In these self-evaporators, the pressure is reduced in a plurality of stages. The vapors from the first self-evaporator may be used to heat the second preliminary heater, while those from the second self-evaporator, which is at a lower temperature, may be used for heating the first preliminary heater. The first self-evaporator is located on a relatively low level and is advantageously of a special type, having a salt leg and boot, provided with a conveyer. This leg should extend upwardly sufficiently far to allow the pressure of the liquid in it to counterbalance the pressure prevailing in this first self-evaporator. From this first self-evaporator, as shown, the brine passes upward to a second self-evaporator. By locating this second self-evaporator at a higher level than the first self-evaporator, the pressure differential therebetween is rendered automatic. From the second self-evaporator, the concentrated brine may be passed into a graining pan which is as shown on the same level and may be any of the ordinary types; but is preferably of a special type provided with air agitating means for controlling the size of salt grain produced.

Air may be introduced into the solution in a plurality of minute jets, keeping it agitated and controlling the size of the grain, while at the same time aiding in evaporation. The residual or tail brine from this pan may be sent to the first preliminary heater after being admixed with sufficient fresh brine to bring the total concentration to such a point as will allow the exact amount of evaporation desirable in the brine passing through the system to the graining pan. As saturated brine boils at about 226° F. under ordinary atmospheric pressure, if the brine has been preliminarily heated to 260° F., there is a drop in temperature of the brine of about 34°, accompanied with a corresponding evaporation of water; "flash" evaporation or self-evaporation. Where a plurality of self-evaporators are employed, this evaporation and resulting drop in temperature is divided up among them. Passing the self-evaporated brine of 226° F. into the pan, further evaporation now takes place and the cooled brine passing as tail brine into the first preliminary heater may have a temperature of about 200° F. While the vapor from brine boiling at 226° F. at ordinary pressure expands and cools to 212° F., where, as in the present invention, the release of the vapor is under pressure, this drop in temperature does not take place to such an extent. This is of importance in the present invention since more heat units can be carried by the hotter vapor. If the pressure on the brine in the self-evaporator be released so as to bring the temperature of the brine from, say, 260° F. to 245° F., steam of a temperature of 231° will be available which may be utilized in heating the same amount of brine to a higher temperature with the same amount of heating surface than can be caused by an evaporator flashing steam at 212° F.

In the accompanying illustration, there is shown more or less diagrammatically an organization or system of apparatus elements useful in performing the process above described, and for other purposes.

In this showing Figure 1 is a complete installation; and Fig. 2 is a similar fragmental view of a modification.

Element 1 is the first preheater. It may be of any ordinary structure; such as that common in heat interchanges, and heating vapor may pass either around or inside the tubes of a tube nest (not shown). Heating vapor is supplied by vapor line 2. Fresh brine which may have advantageously been heated enters through pipe 3 while tail brine from the graining pan enters through pipe 4. The relative proportions of fresh brine and of tail brine may be controlled to bring the degree of saturation as may be desired. From this first preheater, the brine is taken by pump 5 which delivers it under some pressure into the second preheater 6. The first preheater is on the suction side of the pump and the second on the pressure side. The amount of pressure may be as desired. The second preheater is supplied with self-evaporation steam through pipe 7, coming from the first self-evaporator in series. Heated brine goes out through conduit 8, to superheater 9 which may be supplied with live steam in amount sufficient to bring the temperature to 260° F. All these heaters may be, like the first mentioned heater, of the ordinary heat interchanger type. In this superheating operation when the brine becomes hot there is generally a tendency to deposit gypsum and other impurities and the liquid heated in passing through the superheater is best directly passed into and through a filter 10, which may be a cylindrical vessel or casing partly filled with small stones which present a large amount of surface for the deposit of gypsum or calcium sulfate, and other impurities, carried by and depositing from the superheated brine. From this device the brine, which may be at a temperature of 260° F. or above, passes through conduit 11 to the first self-evaporator 12. As shown, this self-evaporator is on a relatively low level and of a particular type and provided with means for removing deposited salt. As shown, it is provided with a bottom 13 forming the boot of elevating means 14, which consists of a tube, which may be of rectangular cross section, closed except at the top, and provided with salt conveying mechanism, which may be composed of chain 15, sprocket wheels 16 and buckets 17 carried by the chain. The height of this tube should be sufficient to allow the weight of the brine therein to counterbalance the pressure within the self-evaporator and allow ready removal of salt without disturbance of pressure conditions. Vapor released in this first self-evaporator is carried through a suitable conduit (7) to the second preheater previously described. The self-evaporated and somewhat concentrated brine leaves this self-evaporater through brine main 18 going upwardly to a second self-evaporator 19 located, as shown, at a higher level. In this second self-evaporator another drop in temperature and pressure is allowed with a result of a further concentration and the liberation of vapors. These vapors pass through a vapor line (2) to the first preheater described. Brine is led from this self-evaporator through conduit 20 to a graining pan 21 which may be provided with air stirring means (not shown). Tail brine from this pan goes into the first preheater as previously described. As there is, or may be, some formation of grain salt in this second self-evaporator, it is useful to provide it with a depending leg 22 passing down into the first self-evaporator and allowing the discharge of grain salt into the latter. It is however possible, as shown in Fig. 2, to make the two self-evaporators independent.

In Fig. 2, the elements are given the same reference characters as in Fig. 1. The difference between the two figures is in the omission of depending leg 22. As shown, in Fig. 2, the only communication between the first self-evaporator 12 and the second self-evaporator 19 is through vertical brine conduit 18. In Fig. 1 a double communication between 19 and 12 exists, partly through vertical leg 22 and partly through vertical pipe 18. Upon the height of the liquid column in 18 and 22, depends the pressure differential, and consequently the temperature, between 12 and 19. The difference in height automatically produces a constant difference in temperature between the two self-evaporators. In Fig. 2 all the communication is through 18.

In the operation of the structure of Fig. 2, the hot superheated filtered brine comes in, as before, through 11. In 12 it suffers a drop in temperature with a production of vapors which pass off, as before, through 7. The brine which is now at a lower temperature passes upward through 18 into 19 to undergo a further drop in temperature and pressure. The pressure, and consequently the temperature differential, between 19 and 12 obviously depend upon the height of the liquid column in 18. And since the height of this liquid column in 18 is set, once for all, in erecting the apparatus, the pressure and temperature differential between 12 and 19 is fixed; there is no necessity for the provision of regulating valves, etc.

The apparatus herein shown and described I do not claim in this application, it forming the subject matter of my divisional application Ser. No. 648,288 filed, Sept. 8, 1911.

What I claim is:—

1. The process of graining salt which comprises preheating brine by self-evaporation vapors, placing the preheated brine under pressure, further heating in successive stages to a relatively high temperature adapted to cause deposition of impurities, one such stage being by other self-evaporation vapors and another by steam, filtering the so-heated brine, releasing the pressure on the heated brine in at least two stages in vertically separated apparatus with the brine feed from the lower to the upper in series, returning the vapors from one such stage to serve in preheating and the vapors from another such stage to aid in further heating and causing the self-evaporated brine to undergo further evaporation under atmospheric pressure to produce grained salt.

2. The process of graining salt which comprises preheating adjusted proportions of fresh brine and of residual or tail brine from a final evaporating operation, said preheating being performed by self-evaporation vapors from a later stage, placing the preheated brine under pressure, further heating in successive stages to a relatively high temperature adapted to cause deposition of impurities, one such stage being by other self-evaporation vapors and another by steam, filtering the so-heated brine releasing the pressure in at least two stages in vertically separated apparatus with the brine feed from the lower to the upper in series, returning the vapors from one such stage to serve in preheating and the vapors from another such stage to aid in further heating and causing the self-evaporated brine to undergo further evaporation under atmospheric pressure to produce grains of salt.

3. The process of evaporating brine which comprises producing a supply of purified superheated brine at a temperature of at least 260° F., the heating of the brine being in a plurality of stages, passing such superheated brine successively from below upward through two pressure releasing devices at different levels, whereby the pressure differential is maintained constant, and releasing the pressure in each such device to produce vapors, returning the vapors to serve in producing the heated brine and delivering the brine from the pressure releasing devices into a pan for graining.

4. The process of evaporating brine which comprises preheating brine, placing the brine under pressure, bringing to a temperature of at least 260° F. in a plurality of successive stages, transmitting the brine thus heated through a device adapted to collect deposited matter, releasing the pressure in a plurality of stages, the release in one such stage being sufficient to cause a drop to about 245° F., transferring the heat of the vapors from such a stage to preheated brine and returning the heat of the vapors from a following pressure-releasing stage to aid in the preheating of the brine.

5. The process of evaporating brine which comprises withdrawing self-evaporated brine from a grainer at a temperature of about 200° F., admixing with new brine, preheating the mixed brines with vapor derived from a secondary pressure-releasing stage, placing the preheated brine under pressure, raising its temperature with the aid of vapors from a primary pressure-releasing stage, further heating to bring the temperature to about 260° F. and cause a tendency to deposit impurities, passing the heated brine through a device adapted to collect such impurities, passing the purified brine through a primary and a secondary pressure-releasing stage to furnish the stated vapors and drop the temperature to about 226° F. and transmitting the brine to a grainer.

6. The process of evaporating brine which comprises preheating brine, placing it under pressure, further heating it to about 260° F. to cause a tendency to drop impurities, passing through a device adapted to collect such impurities, releasing the pressure in a plurality of stages with sufficient evaporation in each such stage to permit separation of salt, returning the released vapors from each such stage to aid in the heating operations and passing the treated brine at a temperature of about 226° F. into an open grainer.

Signed at St. Clair, in the county of St. Clair and State of Michigan, this 27th day of May A. D. 1911.

CHAS. L. WEIL.

Witnesses:
LAURA MOORE,
GEORGE ALBERT SCHWAB.